United States Patent Office 3,594,455
Patented July 20, 1971

3,594,455
METHODS FOR MANUFACTURING CARBON AND/OR GRAPHITE MATERIALS
Boris Vasilievich Polovoi, Ulitsa Degtyareva 41-a, kv. 33; Jury Ivanovich Barkov, Ulitsa Timiryazeva 28, kv. 1; Ivan Fedorovich Sukhorukov, Pereulok Artilleriisky 6, kv. 69; and Stanislav Gavrilovich Rodionov, Ulitsa Kasiinskaya 25, kv. 148, all of Chelyabinsk, U.S.S.R.
No Drawing. Filed July 2, 1969, Ser. No. 838,649
Int. Cl. C01b 31/08
U.S. Cl. 263—52                                 10 Claims

ABSTRACT OF THE DISCLOSURE

Carbon and/or graphite materials having high density and mechanical strength are prepared by impregnation of a solid carbonaceous material with a solution of a chemically active compound which is an inorganic compound containing nickel, manganese, barium, sulfur or $NO_3$, $NO_2$, $ClO_3$ or $ClO_4$ groups or an organic compound containing nitro, phenol, peroxide or acid groups, followed by impregnation with a fluid carbonaceous material, e.g. coal tar pitch, and heat treatment.

---

The present invention relates to methods for manufacturing carbon and/or graphite materials.

Carbon and/or graphite materials are now being widely used in many branches of industry: in metallurgy—for melting steels and alloys; in chemical industry—for electrolysis of melts and solutions; in machine-building industry—for manufacturing sealing parts and pieces, exposed to friction; in electrical engineering—for manufacturing parts of electro-vacuum apparatuses, etc.

Independently of the operational conditions, the quality of the materials should meet a number of requirements, in particular, they must be dense and strong.

Known in the prior art is a method for preparing carbon and/or graphite materials, comprising impregnating a solid carbonaceous material with molten metals and fluid carboneceous substances, for instance, with carbon and/or pitches and tars. To obtain denser and stronger coal-graphite materials the said impregnation operation is repeated several times. However, as the number of impregnation operations is increased, their efficiency is reduced. Besides, after each impregnation the impregnated material has to be heat treated, which prolongs the process of its manufacture and makes it more expensive.

Impregnation with organic resins increases the mechanical strength of carbon and/or graphite materials, but the efficiency of this method is limited by the fact that the overwhelming majority of resins used for this purpose have a low heat-resistance.

An object of the present invention is to manufacture carbon and/or graphite materials having high density and mechanical strength.

This object is achieved through a method for preparing carbon and/or graphite materials by their impregnation with carbonaeous substances followed by heat treatment. According to the present invention, a solid carbonaceous material prior to the impregnation with fluid carbonaceous substances is additionally impregnated with solutions of chemically active compounds, which are capable of evolving active atoms and groups during heating. Thereafter they are dried to eliminate the solvent therefrom.

The chemically active compounds may be compounds containing nickel, manganese, barium, sulphur; compounds containing groups $NO_3$, $NO_2$, $ClO_3$, $ClO_4$; organic compounds containing nitro-groups, phenol groups, peroxide groups and acids.

As a result of treatment of a solid carbonaceous material with a chemically-active compound, the walls of the pores in the carbonaceous material are coated with an extremely thin layer of this compound, which, during heat treatment after impregnation with fluid carbonaceous substances, while decomposing chemically reacts both with the surface of pores in the solid carbonaceous material and the fluid impregnating carbonaceous substance, for instance, coal-tar pitch. As a result of this, the caking of the fluid carbonaceous substance (coal-tar pitch) with the solid carbonaceous material is carried out not only with the aid of cohesive forces, but also due to the formed free bonds of the chemically-active compound; that is why the mechanical strength of the carbon and/or graphite material is considerably increased.

Data characteristic of the mechanical compressive strength of carbon and/or graphite samples manufactured according to the invention, are given below; data relating to a carbon and/or graphite specimen prepared by the prior art method are given for comparison's sake.

The mechanical compressive strength of a specimen prepared from a solid carbonaceous material impregnated with 15% nickel nitrate solution and then with coal-tar pitch, is found to be equal to 580 kg./cm.$^2$.

The mechanical compressive strength of a specimen prepared from a solid carbonaceous material impregnated only with coal-tar pitch, is found to be equal to 360 kg./cm.$^2$.

The identity of the impregnation materials used and the quality characteristics of the carbon and/or graphite material (green, baked and graphitized) thus obtained are given in the following table.

The given table shows that the material manufactured according to the present invention, as compared with the material manufactured according to the prior-art method (reference specimen), has a uniform structure with density increased by 0.08 g./cm.$^3$, and strength increased by as much as 1.53–1.86 times.

The given data show that the use of the method proposed for manufacturing the carbon and/or graphite material permits properties of the material to be considerably improved without incurring great expense.

The proposed method can be used at each plant manufacturing electrodes and electrical-coal works.

TABLE 1

| Characteristics | Material impregnated with— | | | | | |
|---|---|---|---|---|---|---|
| | Ammonium persulfate | Nickel ammonium sulfate | Gallic acid | 2.5-dichloronitrobenzene | Ammonium nitrate | Non-impregnated material [1] |
| Volumetric weight, g./cm.$^3$: | | | | | | |
| After pressing | 1.50 | 1.50 | 1.50 | 1.50 | 1.50 | 1.35 |
| After burning | 1.50 | 1.50 | 1.50 | 1.50 | 1.50 | 1.46 |
| After graphitizing | 1.70 | 1.71 | 1.71 | 1.71 | 1.71 | 1.63 |
| Mechanical compressive strength, kg./cm.$^2$, after graphitizing | 550 | 570 | 670 | 660 | 670 | 360 |
| Structure | [2] | [2] | [2] | [2] | [2] | [3] |

[1] A reference specimen.
[2] Dense, with fine pores, the pores being uniformly distributed.
[3] Loose, with large pores, the pores being non-uniformly distributed.

The nature of the present invention will become more fully apparent from a consideration of the following description of an exemplary embodiment of the method for manufacturing coal-graphitic materials.

Prior to impregnating with coal-tar pitch, the burnt material obtained by pressing fine-grained, coke-pitch powders in a closed press-mould, was impregnated with 15% water solutions of 2,5-dichloronitrobenzene and ammonium persulfate.

The impregnation process comprises the following steps: after placing the burnt blanks into an autoclave, vacuum of 600 to 630 mm. of mercury column is created therein, and the blanks are held under these conditions for 30 min. Thereafter, an aqueous solution of a chemical compound is introduced into the autoclave, and the pressure is increased up to 3 to 4 atms., the blanks being held under this pressure for a period of 45 min. Then the blanks are discharged and dried at a temperature of 110±5° until a constant weight is obtained. An eventual increase in the weight is determined for the impregnated and dried blanks. The obtained results are given in Table 2.

TABLE 2

| Name of chemical compound to be used for impregnation | Concentration of solution, percent | Weight of blanks prior to impregnation, kg. | Weight of blanks after impregnation, kg. | Increase in weight after impregnation, kg. | Temperature of drying, °C. | Weight of blanks after drying, kg. | Increase in weight after drying, percent |
|---|---|---|---|---|---|---|---|
| 2.5-dichloronitrobenzene | 15 | 6.00 | 7.920 | 20.0 | 110±5 | 7.763 | 2.8 |
| Ammonium persulfate | 15 | 6.00 | 7.770 | 19.5 | 110±5 | 7.762 | 2.8 |

Thereafter the dried material is impregnated with coal-tar pitch in the autoclave according to the following sequence of operations: creating vacuum not less than 630 mm. of mercury column; holding under this pressure for 1 hour; and holding at a pressure of 4 to 5 atms. for a period of 3 hours. The blanks thus impregnated were first baked and then graphitized in graphitization ovens. The quality characteristics of the tested samples are shown in Table 1.

What we claim is:

1. A method for manufacturing carbon and/or graphite materials having high density and mechanical strength comprising the steps of (1) impregnating a blank moulded from a solid carbonaceous material with a solution of a chemically active compound capable of evolving active atoms and/or groups during heating; (2) drying the impregnated blank; (3) impregnating the dried blank with a fluid carbonaceous substance; and (4) heat treating the impregnated blank obtained in step (3).

2. The method as claimed in claim 1, wherein the chemically active compound is selected from (a) inorganic compounds containing nickel, manganese, barium, sulfur, $NO_3$ groups, $NO_2$ groups, $ClO_3$ groups or $ClO_4$ groups or (b) organic compounds containing nitro groups, phenol groups, peroxide groups or acid groups.

3. The method as claimed in claim 1, wherein step (1) is carried out at a pressure of 3 to 4 atmospheres.

4. The method as claimed in claim 3, wherein step (3) is carried out at a pressure of 4 to 5 atmospheres.

5. The method as claimed in claim 2, wherein the chemically active compound is nickel nitrate.

6. The method as claimed in claim 2, wherein the chemically active compound is ammonium nitrate.

7. The method as claimed in claim 2, wherein the chemically active compound is ammonium persulfate.

8. The method as claimed in claim 2, wherein the chemically active compound is gallic acid.

9. The method as claimed in claim 2, wherein the chemically active compound is 2,5-dichloronitrobenzene.

10. The method as claimed in claim 2, wherein the carbonaceous substance is coal tar pitch.

References Cited

UNITED STATES PATENTS 2,162,366  6/1939  Barker et al. _____ 252—445X
2,204,148  6/1940  Neims _____ 263—52

JOHN J. CAMBY, Primary Examiner

U.S. Cl. X.R.

252—445